(12) United States Patent
Matsumoto

(10) Patent No.: US 12,263,703 B2
(45) Date of Patent: Apr. 1, 2025

(54) TIRE

(71) Applicant: The Yokohama Rubber Co., LTD., Tokyo (JP)

(72) Inventor: Kenichi Matsumoto, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 258 days.

(21) Appl. No.: 17/757,039

(22) PCT Filed: Dec. 7, 2020

(86) PCT No.: PCT/JP2020/045393
§ 371 (c)(1),
(2) Date: Jun. 8, 2022

(87) PCT Pub. No.: WO2021/117655
PCT Pub. Date: Jun. 17, 2021

(65) Prior Publication Data
US 2023/0020227 A1  Jan. 19, 2023

(30) Foreign Application Priority Data
Dec. 13, 2019 (JP) .................. 2019-225701

(51) Int. Cl.
*B60C 11/12* (2006.01)
*B60C 11/03* (2006.01)
*B60C 11/13* (2006.01)

(52) U.S. Cl.
CPC ...... *B60C 11/1281* (2013.01); *B60C 11/0304* (2013.01); *B60C 11/1263* (2013.01); *B60C 11/1392* (2013.01); *B60C 2011/0348* (2013.01)

(58) Field of Classification Search
CPC ............. B60C 11/1384; B60C 11/1392; B60C 11/1281; B60C 2011/0381; B60C 2011/0348
See application file for complete search history.

(56) References Cited

U.S. PATENT DOCUMENTS

| | | | |
|---|---|---|---|
| 11,945,263 B2* | 4/2024 | Mizushima | B60C 11/1392 |
| 2010/0212792 A1* | 8/2010 | Mita | B60C 11/033 |
| | | | 152/209.9 |

(Continued)

FOREIGN PATENT DOCUMENTS

| | | |
|---|---|---|
| DE | 11 2017 004 338 T5 | 5/2019 |
| EP | 3 208 111 A1 | 8/2017 |

(Continued)

OTHER PUBLICATIONS

English machine translation of JP-63312204-A. (Year: 1988).*

*Primary Examiner* — Robert C Dye
(74) *Attorney, Agent, or Firm* — Thorpe North & Western

(57) ABSTRACT

A tire tread pattern includes: first sipes in a first land portion between first and second circumferential main grooves; first chamfered surfaces in which a tread surface of the first land portion is inclined toward a first circumferential main groove side in an end portion in a width direction, the first sipes opening to the first chamfered surfaces; second sipes in a second land portion on an opposite side of the first land portion with respect to the second circumferential main groove; and second chamfered surfaces in which a tread surface of the second land portion is inclined toward a second circumferential main groove side in an end portion in the width direction, the second sipes opening to the second chamfered surfaces. The first and second chamfered surfaces are greater in length in the circumferential direction than in the width direction.

16 Claims, 5 Drawing Sheets

(56) References Cited

U.S. PATENT DOCUMENTS

| | | | | |
|---|---|---|---|---|
| 2012/0285592 A1* | 11/2012 | Kameda | ............... | B60C 11/033 |
| | | | | 152/209.8 |
| 2012/0318420 A1* | 12/2012 | Sawai | ................ | B60C 11/0306 |
| | | | | 152/209.15 |
| 2015/0231928 A1* | 8/2015 | Sato | ................... | B60C 11/1369 |
| | | | | 152/209.18 |
| 2017/0210175 A1* | 7/2017 | Yoshimura | ......... | B60C 11/0309 |
| 2017/0225515 A1* | 8/2017 | Hayashi | ............. | B60C 11/0304 |
| 2018/0065417 A1* | 3/2018 | Hoshiba | ............. | B60C 11/1263 |
| 2018/0354312 A1* | 12/2018 | Scheifele | ............ | B60C 11/1281 |
| 2018/0370290 A1* | 12/2018 | Hirosue | ............. | B60C 11/1263 |
| 2019/0184752 A1 | 7/2019 | Kouda et al. | | |
| 2021/0008928 A1 | 1/2021 | Nakazaki | | |

FOREIGN PATENT DOCUMENTS

| | | | |
|---|---|---|---|
| EP | 3 421 263 A1 | | 1/2019 |
| JP | 63312204 A | * | 12/1988 |
| JP | 2003-170709 A | | 6/2003 |
| JP | 2009-61985 A | | 3/2009 |
| JP | 2014-73706 A | | 4/2014 |
| JP | 2015-189349 A | | 11/2015 |
| JP | 2017-132317 A | | 8/2017 |
| JP | 2017-226369 A | | 12/2017 |
| WO | WO 2019 159 564 A1 | | 8/2019 |

* cited by examiner

TIRE

TECHNICAL FIELD

The present technology relates to a tire having a tread pattern in a tread portion.

BACKGROUND ART

One known way to improve the wet performance of a tire is to provide, in a tread surface of the tire, a main groove extending in a tire circumferential direction and also a lug groove extending in a tire width direction for ensuring drainage properties. However, in a configuration in which the lug groove has a large groove volume, a loud popping sound is generated when kicking out, and performance to reduce tire noise (hereinafter referred to as noise performance) is degraded.

In the related art, there is known a tire without a groove having a width of 2 mm or more provided in a crown land portion or a middle land portion in a tread portion of the tire (see Japan Unexamined Patent Publication No, 2017-226369).

In a configuration of Japan Unexamined Patent Publication No. 2017-226369, to avoid degrading noise performance, a groove having a width of 2 mm or more is not provided in a crown land portion or a middle land portion in a tread surface including a main groove and a lug groove, groove volume decreases, and thus noise performance improves, but drainage properties cannot be ensured due to a decrease in the groove volume, degrading wet performance.

SUMMARY

The present technology provides a tire that provides improved wet performance while suppressing degradation of noise performance.

An aspect of the present technology is a tire including a tread pattern in a tread portion.

The tread pattern includes: a first circumferential main groove and a second circumferential main groove extending in a tire circumferential direction and disposed at an interval in a tire width direction; a plurality of first sipes extending in the tire width direction within a region of a first land portion between the first circumferential main groove and the second circumferential main groove and disposed at intervals in the tire circumferential direction; a first chamfered surface having a tread surface of the first land portion inclined toward the first circumferential main groove in an end portion in the tire width direction on a first circumferential main groove side of the first land portion, the first chamfered surface being provided in plurality in the tire circumferential direction, and the first sipes opening to the plurality of the first chamfered surfaces without reaching a groove wall of the first circumferential main groove; a plurality of second sipes extending in the tire width direction within a region of a second land portion located on an opposite side of the region of the first land portion with respect to the second circumferential main groove and disposed at intervals in the tire circumferential direction; and a second chamfered surface having a tread surface of the second land portion inclined toward the second circumferential main groove in an end portion in the tire width direction on a second circumferential main groove side of the second land portion, the second chamfered surface being provided in plurality in the tire circumferential direction, and the second sipes opening to the plurality of the second chamfered surfaces without reaching a groove wall of the second circumferential main groove. A length in the tire circumferential direction of the first chamfered surface and a length in the tire circumferential direction of the second chamfered surface are greater than a length in the tire width direction of the first chamfered surface and a length in the tire width direction of the second chamfered surface.

Preferably, the length of the chamfered surface in the tire circumferential direction is from 5 to 50% of a length of an interval of the sipes adjacent in the tire circumferential direction, the sipes opening to the chamfered surface.

Preferably, a ratio of the length of the chamfered surface in the tire circumferential direction to the length of the chamfered surface in the tire width direction is greater than 1, and 10 or less.

Preferably, the lengths in the tire circumferential direction of the first chamfered surface and the second chamfered surface are different from each other.

Preferably, the first chamfered surface and the second chamfered surface are disposed on one side of a tire centerline in the tire width direction, and of the first chamfered surface and the second chamfered surface, the length in the tire circumferential direction of the one chamfered surface that is farther from the tire centerline is greater than the length in the tire circumferential direction of the one chamfered surface that is closer to the tire centerline.

Preferably, ranges of positions of the first chamfered surface and the second chamfered surface in the tire circumferential direction do not overlap each other.

Preferably, a maximum depth of the chamfered surface is greater than a depth of the sipe opening to the chamfered surface.

Preferably, the chamfered surface has a substantially triangular shape that decreases in length in the tire width direction from one side in the tire circumferential direction to an other side in the tire circumferential direction.

Preferably, the sipe includes a raised bottom portion at an opening end portion of the sipe opening to the chamfered surface, the raised bottom portion having a depth greater than a maximum depth of the sipe.

Preferably, the tread pattern further includes, in the region of the land portion, a wall surface of the land portion adjacent to the chamfered surface, the wall surface of the land portion extending continuously from a wall surface of the sipe, from an opening end portion of the sipe opening to the chamfered surface to a wall surface of the circumferential main groove to which the chamfered surface is inclined, and the wall surface extends without being inclined with respect to a tire radial direction.

Preferably, the tread pattern further includes, in the region of the land portion, a wall surface of the land portion adjacent to the chamfered surface, the wall surface of the land portion extending continuously from a wall surface of the sipe, from an opening end portion of the sipe opening to the chamfered surface to a wall surface of the circumferential main groove to which the chamfered surface is inclined, and the wall surface extends along an extension direction of the sipe opening to the chamfered surface.

Preferably, the first sipe and the second sipe are inclined to the same side in the tire circumferential direction with respect to the tire width direction.

Preferably, the tread pattern includes a circumferential narrow groove extending in the tire circumferential direction in the region of the first land portion and having a groove width smaller than a groove width of the first circumferential main groove and the second circumferential main groove, and the first sipe is disposed in a region between the first circumferential main groove and the circumferential narrow groove and is connected to the circumferential narrow groove.

Preferably the tread pattern includes a third chamfered surface having a tread surface inclined toward the circumferential narrow groove in an end portion in the tire width direction on a circumferential narrow groove side of a region including the first sipes, the region being one of two regions of the first land portion that are divided in the tire width direction by the circumferential narrow groove. The third chamfered surface is provided in plurality adjacent in the tire circumferential direction to connection end portions of the first sipes with the circumferential narrow groove.

Preferably, a length of the third chamfered surface in the tire circumferential direction is smaller than the lengths of the first chamfered surface and the second chamfered surface in the tire circumferential direction. Preferably, a maximum depth of the third chamfered surface is smaller than a depth of the first ripe.

Preferably the tread pattern does not include lug grooves extending in the tire width direction within the region of the land portion.

The tire of the aspect described above can suppress degradation of wet performance while improving noise performance.

DETAILED DESCRIPTION

Overall Description of Tire

Hereinafter, a tire of the present embodiment is described. The tire of the present technology is preferably a pneumatic tire, and the tire of the present embodiment is a pneumatic tire. A pneumatic tire is a tire including a cavity region surrounded by a tire and a rim, the cavity region being filled with air. Note that in the tire of the present embodiment, the cavity region surrounded by a tire and a rim may be filled with an inert gas such as nitrogen or other gas instead of air. The present embodiment includes various embodiments described below.

Figure 1:
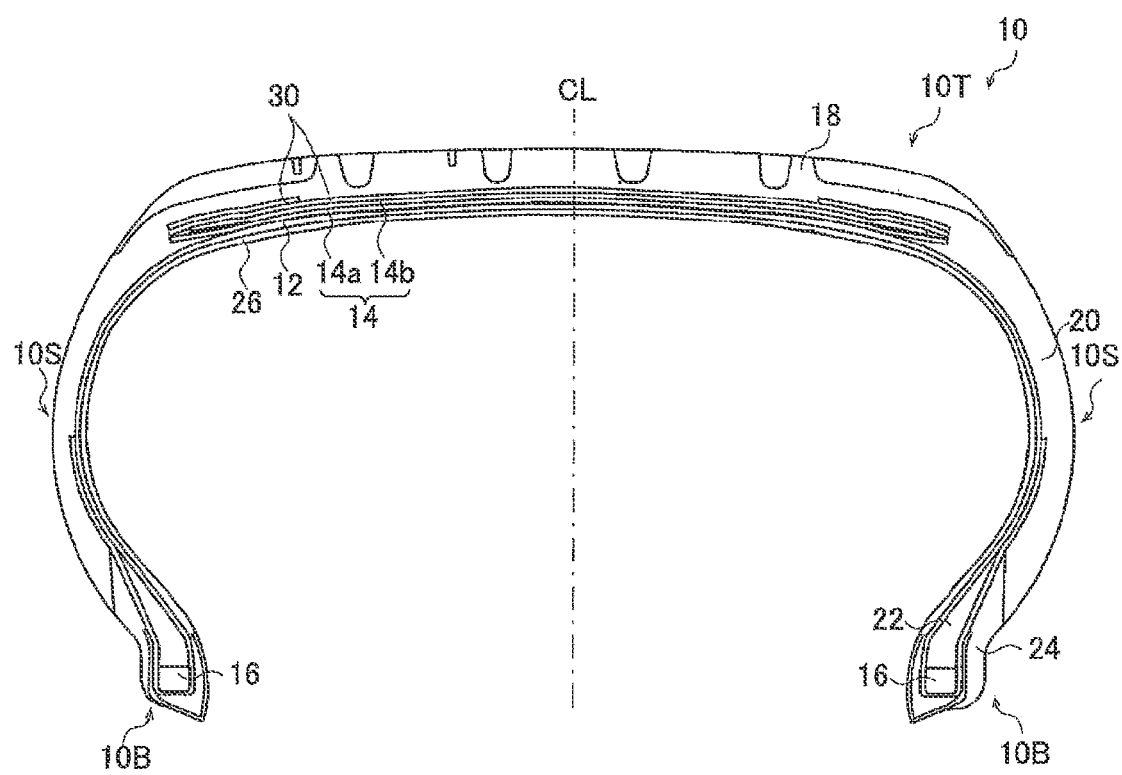
FIG. 1 is a diagram illustrating an example of a profile cross-section of a pneumatic tire according to the present embodiment.

FIG. 1 is a tire cross-sectional view illustrating an example of a profile cross-section of a pneumatic tire (hereinafter referred to simply as "tire") 10.

The tire 10 is, for example, a tire for a passenger vehicle. "Tire for a passenger vehicle" refers to a tire specified in Chapter A of the JATMA YEAR BOOK 2012 (standards of The Japan Automobile Tyre Manufacturers Association, Inc.). The tire 10 can also be applied to a tire for a light truck specified in Chapter B and a tire for a truck and a bus specified in Chapter C.

Tire width direction is a direction parallel to a rotation axis of a tire. "Outer side in the tire width direction" is a side distant from a tire centerline CL (tire equator line) representing a tire equatorial plane in the tire width direction. Additionally, "inner side in the tire width direction" is a side closer to the tire centerline CL in the tire width direction. Tire circumferential direction is a direction of rotation about the rotation axis of a tire. "Tire radial direction" is a direction orthogonal to the rotation axis of a tire. "Outer side in the tire radial direction" refers to a side away from the rotation axis. Similarly, "inner side in the tire radial direction" refers to a side closer to the rotation axis.

Tire Structure

The tire 10 includes a tread portion 10T including a tread pattern, a pair of bead portions 10B, and a pair of side portions 10S provided in two sides of the tread portion 10T and connected to the pair of bead portions 10B and the tread portion 10T.

The tire 10 includes a carcass ply 12, a belt 14, and a bead core 16 as framework members and mainly includes, around the framework members, a tread rubber member 18, a side rubber member 20, bead filler rubber members 22, rim cushion rubber members 24, and an innerliner rubber member 26.

The carcass ply 12 is formed of a carcass ply member that is made of organic fibers covered with rubber and wound between a pair of the bead cores 16 having an annular shape into a toroidal shape. The carcass ply 12 is wound around the bead cores 16 and extends to an outer side in the tire radial direction. The belt 14 is provided in an outer side of the carcass ply 12 in the tire radial direction and includes two belt members 14a, 14b. The belt 14 includes a member made of a steel cord that is covered with rubber and inclined at a predetermined angle, for example, at from 20 to 30 degrees, with respect to the tire circumferential direction. The belt member 14a of an inner layer has a width in the tire width direction that is greater than a width in the tire width direction of the belt member 14b of an outer layer. The steel cords of the two belt members 14a, 14b are inclined in opposite directions. As such, the belt members 14a, 14b are crossing layers serving to suppress expansion of the carcass ply 12 due to pressure of the air in the tire.

The tread rubber member 18 is provided in an outer side of the belt 14 in the tire radial direction. The side rubber members 20 are connected to two end portions of the tread rubber member 18 and form the side portions 10S. The rim cushion rubber members 24 are provided at ends in an inner side of the side rubber member 20 in the tire radial direction and come into contact with a rim on which the tire 10 is mountable. Each of the bead filler rubber members 22 is provided in an outer side of each of the bead cores 16 in the tire radial direction and is interposed between a portion of the carcass layer 12 prior to being wound around the bead core 16 and a portion of the carcass ply 12 wound around the bead core 16. The innerliner rubber member 26 is provided on an inner surface of the tire 10 facing a tire cavity region that is filled with air and is surrounded by the tire 10 and the rim.

Additionally, two belt covers 30 made of organic fiber covered with rubber are provided between the belt member 14b and the tread rubber member 18. The two belt covers 30 cover the belt 14 from the outer side of the belt 14 in the tire radial direction.

Tread Pattern

Figure 2:
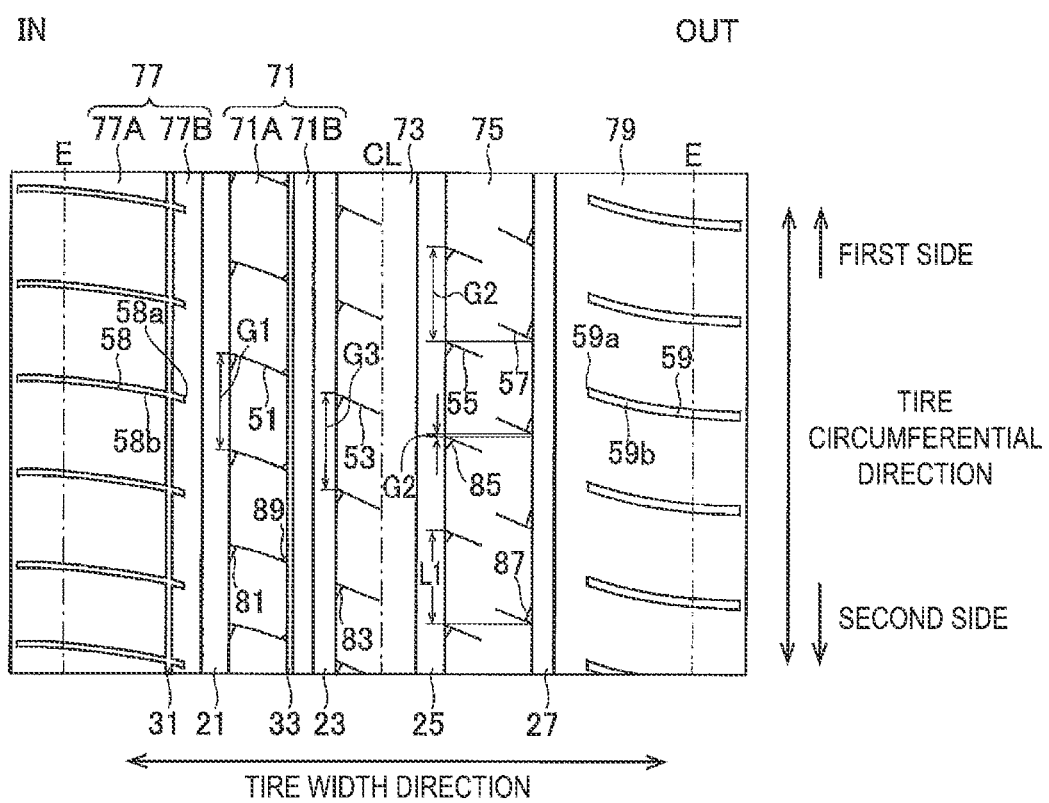
FIG. 2 is a diagram illustrating an example of a tread pattern of the tire of FIG. 1.

FIG. 2 is a diagram illustrating a portion developed into a plan view of an example of a tread pattern of the tire 10 of FIG. 1.

The tread pattern according to the example illustrated in FIG. 2 includes a first outer main groove 21 (first circumferential main groove), a first inner main groove 23 (second circumferential main groove), a second inner main groove 25, and a second outer main groove 27 as circumferential main grooves extending in the tire circumferential direction.

The first outer main groove 21 and the first inner main groove 23 are provided in a first half-tread region on one side (left side in FIG. 2) of the tire centerline CL in the tire width direction and are disposed at intervals from each other in the tire width direction.

The second inner main groove 25 and the second outer main groove 27 are provided in a second half-tread region on the other side (right side in FIG. 2) in the tire width direction and are disposed at intervals from each other in the tire width direction.

Herein, main groove means a groove having a groove depth of, for example, from 6.5 to 9.0 mm and a groove width of, for example, from 5.0 to 15.0 mm.

The number of main grooves provided in the tread pattern is four in the example illustrated in FIG. 2, but may be, for example, three or five. In a configuration including three main grooves, the first inner main groove 23 and the second inner main groove 25 are, in the example illustrated in FIG. 2, substituted by one circumferential main groove passing over the tire centerline CL.

The tread pattern according to the example illustrated in FIG. 2 further includes narrow grooves 31, 33 as two circumferential narrow grooves extending in the tire circumferential direction. The narrow grooves 31, 33 each have a smaller groove width than the main grooves 21, 23, 25, 27. The narrow grooves 31, 33 each have a smaller groove depth than the main grooves 21, 23, 25, 27. The groove depths of the narrow grooves 31, 33 are, for example, from 1.0 to 5.0 mm and the groove widths of the narrow grooves 31, 33 are, for example, from 0.8 to 3.0 mm.

The narrow groove 31 is provided in a shoulder region 77 of the tread pattern on an outer side of the first outer main groove 21 in the tire width direction.

The narrow groove 33 is provided in a first middle region (region of the first land portion) 71 between the first outer main groove 21 and the first inner main groove 23. The narrow groove 33 is located, within the first middle region 71, on a first inner main groove 23 side of the center in the tire width direction of the first middle region 71.

According to an embodiment, the circumferential narrow groove is preferably not provided in a second middle region 75 and a center region 73, which are described below. In the tread pattern according to the example illustrated in FIG. 2, the circumferential narrow groove is not provided in a shoulder region 79, which is described below.

The tread pattern according to the example illustrated in FIG. 2 further includes first middle sipes 51 (first sipes), center sipes 53 (second sipes), and second middle sipes 55, 57. The first middle sipes 51, the center sipes 53, and the second middle sipes 55, 57 ensure edge components extending in the tire width direction, thus improving an edge effect against a force in a front-rear direction (direction parallel to the tire circumferential direction on a ground contact surface). Herein, sipe refers to a sipe having a sipe depth of, for example, from 2.0 to 7.5 mm and a sipe width of, for example, from 0.3 to 1.0 mm.

A plurality of the first middle sipes 51 are provided at intervals in the tire circumferential direction in the first middle region 71, communicate with the first outer main groove 21, extend in the tire width direction, and close within the first middle region 71.

A plurality of the center sipes 53 are provided at intervals in the tire circumferential direction in the center region (region of the second land portion) 73 between the first inner main groove 23 and the second inner main groove 25, communicate with the first inner main groove 23, extend in the tire width direction, and close within the center region 73.

A plurality of the second middle sipes 55 are provided at intervals in the tire circumferential direction in the second middle region 75 between the second inner main groove 25 and the second outer main groove 27, communicate with the second inner main groove 25, extend in the tire width direction, and close within the second middle region 75.

A plurality of the second middle sipes 57 are provided at intervals in the tire circumferential direction in the second middle region 75, communicate with the second outer main groove 27, extend in the tire width direction in the second middle region 75, and close within the second middle region 75 without reaching the second inner main groove 25.

According to an embodiment, the second middle region 75 may include only either the second middle sipes 55 or the second middle sipes 57.

The tread pattern according to the example illustrated in FIG. 2 further includes shoulder lug grooves 58, 59.

A plurality of the lug grooves 58 are disposed at intervals in the tire circumferential direction in the shoulder region 77 on an outer side in the tire width direction of the first outer main groove 21, extend in the tire width direction from the outer side in the tire width direction toward the first outer main groove 21 within an outer region 77A, in the shoulder region 77, located on an outer side of the narrow groove 31 in the tire width direction, intersect the narrow groove 31, and close within an inner region 77B between the narrow groove 31 and the main groove 21 without reaching the first outer main groove 21.

A plurality of the lug grooves 59 are disposed at intervals in the tire circumferential direction in a shoulder region 79 on an outer side in the tire width direction of the second outer main groove 27, extend in the tire width direction from the outer side in the tire width direction toward the main groove 27 within the shoulder region 79, and close within the region 79 without reaching the main groove 27.

Note that the regions 77A, 79 include ground contact edges E in the tire width direction. "Ground contact edges" refer to two ends in the tire width direction of a ground contact surface where the tire 10 mounted on a regular rim, inflated to a regular internal pressure, and loaded with 88% of a regular load is brought into contact with a horizontal surface, "Regular rim" refers to a "measurement rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular internal pressure" refers to a "maximum air pressure" defined by JATMA, a maximum value in "TIRE LOAD LIMITS AT VARIOUS COLD INFLATION PRESSURES" defined by TRA, or "INFLATION PRESSURES" defined by ETRTO. "Regular load" refers to a "maximum load capacity" defined by JATMA, a maximum value in "TIRE LOAD LIMITS AT VARIOUS COLD INFLATION PRESSURES" defined by TRA, or a "LOAD CAPACITY" defined by ETRTO.

The shoulder lug grooves 58, 59 include closed ends 58a, 59a of the shoulder lug grooves 58, 59, and main groove side portions 58b, 59b, which are located on an outer main groove 21 side and an outer main groove 27 side, respectively, of the ground contact edges E, extend at an incline with respect to the tire width direction.

The tread pattern of the example illustrated in FIG. 2 further includes a first middle chamfered surface 81 (first chamfered surface), a center chamfered surface 83 (second chamfered surface), and second middle chamfer surfaces 85, 87.

An end portion in the tire width direction of the sipe 51, which communicates with the first outer main groove 21, is adjacent in the tire circumferential direction to portions of a land portion. The first middle chamfered surface 81 is a surface having a tread surface of one of the portions of the land portion inclined toward the first outer main groove 21. The first middle chamfered surface 81 is provided in plurality at intervals in the tire circumferential direction, and the first middle sipes 51 open thereto without reaching the groove wall of the first outer main groove 21.

An end portion in the tire width direction of the sipe 53, which communicates with the first inner main groove 23, is adjacent in the tire circumferential direction to portions of a land portion. The center chamfered surface 83 is a surface having a tread surface of one of the portions of the land portion inclined toward the first inner main groove 23. The center chamfered surface 83 is provided in plurality at intervals in the tire circumferential direction, and the center sipes 53 open thereto without reaching the groove wall of the first inner main groove 23.

An end portion in the tire width direction of the sipe 55, which communicates with the second inner main groove 25, is adjacent in the tire circumferential direction to portions of a land portion. The second middle chamfered surface 85 is a surface having a tread surface of one of the portions of the land portion inclined toward the second inner main groove 25. The second middle chamfered surface 85 is provided in plurality at intervals in the tire circumferential direction, and the second middle sipes 55 open thereto without reaching the groove wall of the second inner main groove 25.

An end portion in the tire width direction of the sipe 57, which communicates with the second outer main groove 27, is adjacent in the tire circumferential direction to portions of a land portion. The second middle chamfered surface 87 is a surface having a tread surface of one of the portions of the land portion inclined toward the second outer main groove 27. The second middle chamfered surface 87 is provided in plurality at intervals in the tire circumferential direction, and the second middle sipes 57 open thereto without reaching the groove wall of the second outer main groove 27.

According to the present embodiment, the chamfered surfaces 81, 83 are greater in length in the tire circumferential direction than in the tire width direction. The present embodiment includes the sipes 51, 53 in the first middle region 71 and the center region 73, respectively, and thus has a smaller groove volume and a more excellent noise performance than a configuration including lug grooves instead of the sipes 51, 53. On the other hand, the embodiment includes the chamfered surfaces 81, 83 in the first middle region 71 and the center region 73, respectively, and thus has more edge components in contact with road surface and a greater edge effect than a configuration not including the chamfered surfaces 81, 83. This yields an effect of suppressing a decrease in steering stability performance (wet performance) due to a decrease in drainage properties, which, in turn, is due to the sipes 51, 53 being provided instead of lug grooves. Further, as described above, the present embodiment includes the sipes 51, 53 and thereby ensures edge components that have an effect on a force in a front-rear direction (tire circumferential direction), and thus with the length in the tire circumferential direction of each of the chamfered surfaces 81, 83 being longer than the length in the tire width direction thereof, edge components that have an effect on a force in a front-rear direction can be ensured, edge components that have an effect on a lateral force can also be ensured, and an effect of improving wet performance with respect to forces, in various directions, received from road surface can be obtained. This increases the effect of suppressing a decrease in wet performance. That is, compared to a configuration including lug grooves instead of the sipes 51, 53, the present embodiment suppresses degradation of wet performance while improving noise performance. Note that the present embodiment, which includes the chamfered surfaces 81, 83 in the first middle region 71 and the center region 73, respectively, has a larger groove volume than an embodiment without the chamfered surfaces 81, 83, but the amount of an increase is less than, for example, an embodiment including notches (grooves in a lateral direction, the grooves each having a relatively short length in the extension direction thereof), and the effect thereof on noise performance is small. According to an embodiment, in addition to the chamfered surfaces 81, 83, at least one of the chamfered surfaces 85, 87 is preferably greater in length in the tire circumferential direction than in the tire width direction.

According to an embodiment, the sipes 51, 53 open to the chamfered surfaces 81, 83, respectively, and the length of each of the chamfered surfaces 81, 83 in the tire circumferential direction is preferably from 5 to 50% of the length of the interval between a corresponding one of pairs of the sipes 51, 53, each of the pairs being adjacent in the tire circumferential direction. The chamfered surfaces 81, 83 that are longer in the tire circumferential direction than this percentage may have a deteriorated noise performance due to an increase in the groove volume, and may have an adverse effect on wet performance due to a decrease in the rigidity of the land portions. Further, the chamfered surfaces 81, 83 that are smaller in the tire circumferential direction than this percentage lessen the effect of improving wet performance. The length in the tire circumferential direction of at least one of the chamfered surfaces 85, 87, in addition to the chamfered surfaces 81, 83, is preferably the length of the above percentage.

According to an embodiment, the ratio of the length of each of the chamfered surfaces 81, 83 in the tire width direction to the length thereof in the tire circumferential direction is preferably greater than 1, and 10 or less, and more preferably 1.5 or more and 8 or less. The ratio described above of at least one of the chamfered surfaces 85, 87, in addition to the chamfered surfaces 81, 83, is preferably within the ranges described above.

According to an embodiment, the lengths of the first middle chamfered surface 81 and the center chamfered surface 83 in the tire circumferential direction are preferably different from each other. This embodiment can yield the effect of improving wet performance by the longer one, in the tire circumferential direction, of the chamfered surfaces 81, 83, and the effect of improving noise performance by the shorter one, in the tire circumferential direction, of the chamfered surfaces 81, 83, the longer one having edge components having an effect on a lateral force and the shorter one reducing groove volume. Further, according to an embodiment, the lengths of the second middle chamfered surfaces 85, 87 in the tire circumferential direction are preferably different from each other. In these embodiments, the length of the chamfered surface having the longest length in the tire circumferential direction, of the chamfered surfaces having different lengths in the tire circumferential direction, is preferably from 1.2 to 3 times, and more preferably from 1.5 to 2 times, of the length in the tire circumferential direction of the chamfered surface having the shortest length in the tire circumferential direction.

According to an embodiment, the length in the tire circumferential direction of the first middle chamfered surface 81, which is farther from the centerline CL, than the center chamfered surface 83, is preferably greater than the length in the tire circumferential direction of the chamfered surface 83, which is closer to the tire centerline CL. This embodiment yields the effect of improving noise performance in a region at or near the tire centerline CL and the effect of improving wet performance in a region away from the tire centerline CL, and thus can effectively obtain the effect of suppressing a decrease in wet performance while improving noise performance as described above. Further, according to an embodiment, the length in the tire circumferential direction of the middle chamfered surface 87, which is farther from the tire centerline CL than the middle chamfered surface 85, is preferably greater than the length in the tire circumferential direction of the chamfered surface 85, which is closer to the tire centerline CL.

According to an embodiment, the ranges in the tire circumferential direction of positions of the first middle chamfered surface 81 and the center chamfered surface 83 preferably do not overlap each other. Thus, the chamfered surfaces 81, 83 are dispersed in the tire circumferential direction, and effects of the chamfered surfaces on noise performance can be dispersed. According to another embodiment, the ranges in the tire circumferential direction of positions of the second middle chamfered surfaces 85, 87 preferably do not overlap each other. According to yet another embodiment, the ranges in the tire circumferential direction of positions of the chamfered surfaces 81, 83, 85, 87 preferably do not overlap each other.

Figure 3:
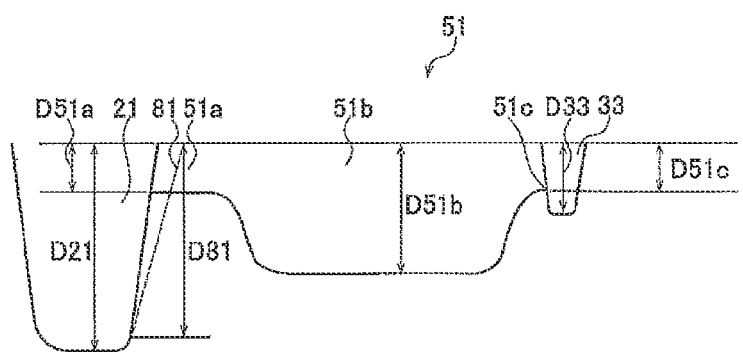
FIG. 3 is a diagram illustrating a cross-section of a region between a first outer main groove and a narrow groove.
Figure 4:
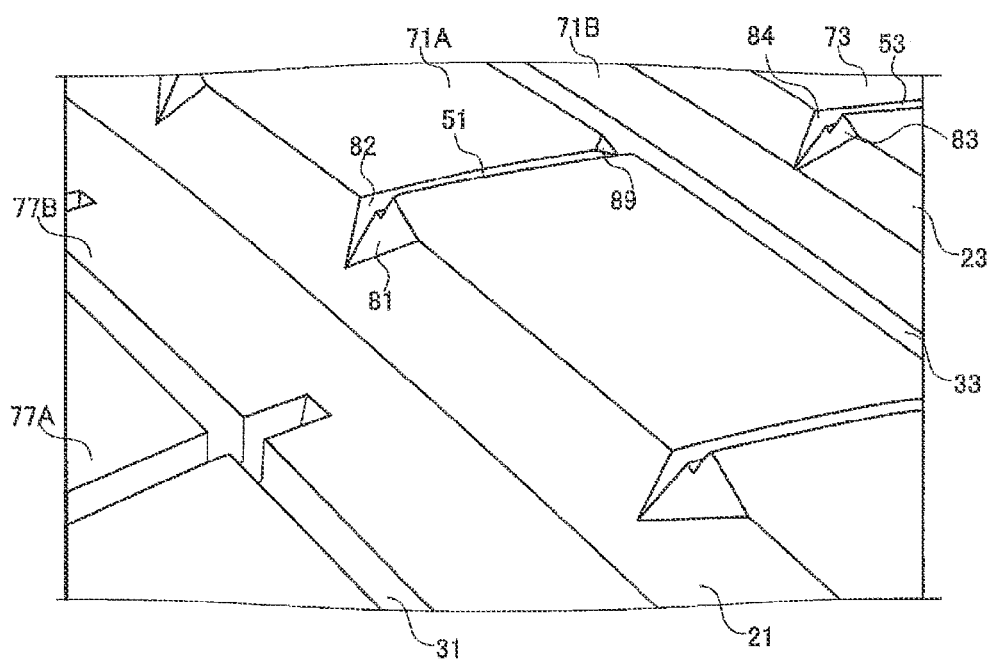
FIG. 4 is a perspective view illustrating an embodiment of a chamfered portion.

According to an embodiment, the maximum depths of the chamfered surfaces 81, 83, 85, 87 are preferably larger than the depths (maximum depths) of the sipes 51, 53, 55, 57, respectively, which open to the chamfered surfaces 81, 83, 85, 87, respectively. The chamfered surfaces 81, 83, 85, 87 are inclined toward the main grooves 21, 23, 25, 27, respectively, and are deepest at the groove walls of the main grooves 21, 23, 25, 27, respectively. FIG. 3 illustrates a maximum depth D81 of the chamfered surface 81. FIG. 3 is a diagram illustrating a cross-section of a region between the first outer main groove 21 and the narrow groove 33. The maximum depths of the chamfered surfaces 81, 83, 85, 87 are thus larger than the depths of the sipes 51, 53, 55, 57, respectively, and the sipes 51, 53, 55, 57, as illustrated in FIG. 4, do not reach the groove walls of the main grooves 21, 23, 25, 27, respectively, open to the chamfered surfaces 81, 83, 85, 87, respectively, and close within the chamfered surfaces 81, 83, 85, 87, respectively. That is, the sipes 51, 53, 55, 57, though not connected (directly open) to the main grooves 21, 23, 25, 27, respectively, are open to the chamfered surfaces 81, 83, 85, 87, respectively, as described above, and are thus in communication with the main grooves 21, 23, 25, 27, respectively. FIG. 4 illustrates an embodiment of the chamfered surfaces 81, 83 as representing the chamfered surfaces 81, 83, 85, 87. In an embodiment in which the sipes 51, 53, 55, 57 are not connected to the main grooves 21, 23, 25, 27, respectively, in contrast to an embodiment in which the sipes 51, 53, 55, 57 are connected to the main grooves 21, 23, 25, 27, respectively, too much deformation of the land portion due to a decrease in rigidity is suppressed, and an appropriate rigidity of the land portions is obtained. Such an embodiment contributes to improving wet performance.

According to an embodiment, the maximum depths of the chamfered surfaces 81, 83 are preferably equal to each other. Also, the maximum depths of the chamfered surfaces 85, 87 are preferably equal to each other. Further, the maximum depths of the chamfered surfaces 81, 83, 85, 87 are preferably equal to each other.

According to an embodiment, a tire circumferential direction side where the first middle chamfered surface 81 is located with respect to the first middle sipe 51 (second side in FIG. 2) is preferably the same side as a tire circumferential direction side where the center chamfered surface 83 is located with respect to the center sipe 53 (second side in FIG. 2). Further, according to an embodiment, a tire circumferential direction side where the second middle chamfered surface 85 is located with respect to the second middle sipe 55 (second side in FIG. 2) is preferably opposite a tire circumferential direction side where the second middle chamfered surface 87 is located with respect to the second middle sipe 57 (first side in FIG. 2).

According to an embodiment, as illustrated in FIG. 4, the chamfered surfaces 81, 83 preferably each have a substantially triangular shape that decreases in length in the tire width direction from one side to the other side in the tire circumferential direction. This can minimize an effect of the chamfered surfaces 81, 83 on noise performance. At least one of the chamfered surfaces 85, 87, in addition to the chamfered surfaces 81, 83, preferably is a surface having the substantially triangular shape. The apexes of the triangle of the substantially triangular shape are located in the groove wall of the main groove, on the ground contact surface of the land portion in contact with the groove wall, and at the boundary between the ground contact surface and the groove wall.

According to an embodiment, each of the sipes 51, 53 preferably opens to a portion of a corresponding one of the chamfered surfaces 81, 83, the portion being where the chamfered surface is longest in the tire width direction (a portion that forms an apex of a substantially triangular shape in FIG. 4). Each of the sipes 55, 57 preferably opens to a portion of a corresponding one of the chamfered surfaces 85, 87, the portion being where the chamfered surface is longest in the tire width direction.

According to an embodiment, each of the sipes 51, 53 preferably has a raised bottom portion (a main groove side communicating portion to be described below) at an opening end portion thereof that opens to a corresponding one of the chamfered surfaces 81, 83, the raised bottom portion having a depth greater than the maximum depth of a corresponding one of the sipes 51, 53. An embodiment in which the sipes 51, 53 are not connected to the main grooves 21, 23 increases the effect of obtaining an appropriate rigidity of the land portions. According to an embodiment, each of the sipes 55, 57 preferably has a raised bottom portion (a main groove side communicating portion to be described below) at an opening end portion thereof that opens to a corresponding one of the chamfered surfaces 85, 87, the raised bottom portion having a depth greater than the maximum depth of a corresponding one of the sipes 55, 57.

According to an embodiment, as illustrated in FIG. 4, the tread pattern further includes, in the first middle region 7 and the center region 73, wall surfaces 82, 84, respectively, of the land portions adjacent to the chamfered surfaces 81, 83, respectively. The wall surfaces 82, 84 each extend continually from the wall surface of a corresponding one of the sipes 51, 53, from an opening end portion of a corresponding one of the sipes 51, 53 to the groove wall of a corresponding one of the main grooves 21, 23, the sipes 51, 53 opening to the chamfered surfaces 81, 83, respectively, and the chamfered surfaces 81, 83 being inclined to the main grooves 21, 23, respectively. The wall surfaces 82, 84 preferably extend without being inclined with respect to the tire radial direction. This reduces groove volume and contributes to improving noise performance, compared to an embodiment in which the wall surfaces 82, 84 are inclined with respect to the tire radial direction. This also improves an effect of cutting water film and contributes to improving wet performance, compared to an embodiment in which the wall surfaces 82, 84 are inclined with respect to the tire radial direction. For the same reasons, the tread pattern preferably further includes, in the second middle region 75, wall surfaces of the land portions adjacent to the chamfered surfaces 85, 87. The wall surfaces of the land portions continually extend from the wall surfaces of the sipes 55, 57, each from an opening end portion of a corresponding one of the sipes 55, 57 to the wall surface of a corresponding one of the main grooves 25, 27, the sipes 55, 57 opening to the chamfered surfaces 85, 87, respectively, and the chamfered surfaces 85, 87 being inclined to the main grooves 25, 27, respectively.

According to an embodiment, each of the wall surfaces 82, 84 preferably extends along the extension direction of a corresponding one of the sipes 51, 53, which open to the chamfered surfaces 81, 83, respectively. Also, each of the wall surfaces 86, 88, which are connected to the chamfered surfaces 85, 87, respectively, preferably extends along the extension direction of a corresponding one of the sipes 55, 57, which open to the chamfered surfaces 85, 87, respectively, in an embodiment in which the wall surfaces extend away from the chamfered surfaces 81, 83, 85, 87 with respect to the extension directions of the sipes 51, 53, 55, 57, respectively (such that the inclination angles with respect to the tire width direction increase), edge components that have an effect on a lateral force may decrease, and the effect of suppressing a decrease in wet performance may decrease.

According to an embodiment, the inclination angles of the sipes 51, 53 with respect to the tire width direction are preferably 45 degrees or less. Edge components having an effect on a lateral force are ensured by the chamfered surfaces 81, 83, and an edge effect can be enhanced with respect to a force in a front-rear direction by reducing the inclination angles of the sipes 51, 53. The inclination angles are preferably from 10 to 35 degrees. Also, the inclination angles of the sipes 55, 57 with respect to the tire width direction are preferably 45 degrees or less.

According to an embodiment, the tread pattern preferably further includes a chamfered surface 89 (third chamfered surface) having a tread surface inclined toward the narrow groove 33 in an end portion in the tire width direction on a narrow groove 33 side of the region 71A including the first middle sipes 51, the region 71A being one of two regions divided in the tire width direction by the narrow groove 33 in the first middle region 71. The chamfered surface 89 is provided in plurality in the tire circumferential direction, and are each adjacent in the tire circumferential direction to a connection end portion of the first middle sipe 51 with the narrow groove 33. According to an embodiment, the maximum depth of the chamfered surface 89 is preferably smaller than the depth of the first middle sipe 51. That is, the first middle sipe 51 preferably connects (directly opens) to the narrow groove 33.

According to an embodiment, preferably, the length of the chamfered surface 89 in the tire circumferential direction is smaller than the lengths of the chamfered surfaces 81, 83 in the tire circumferential direction, and is smaller than the lengths of the chamfered surfaces 85, 87 in the tire circumferential direction.

According to an embodiment, the chamfered surface 81 and the chamfered surface 89 are preferably located on opposite sides of the first middle sipe 51 in the tire circumferential direction (second side and first side in FIG. 2).

According to an embodiment, the tread pattern preferably has a vehicle mounting orientation designated such that the second half-tread region is disposed on a vehicle outer side ("out" side illustrated in FIG. 2) of the first half-tread region. As described above, the effect of improving noise performance can be obtained in the first middle region 71 and the center region 73, which are mutually adjacent, and the first half-tread region including the chamfered surfaces 81, 83 may be disposed on a vehicle inner side to effectively improve noise performance. Also, the second half-tread region has a smaller groove area ratio than the first half-tread region, and thus improves noise performance by being disposed on the vehicle outer side.

Number of Intervals of Middle Sipes

According to an embodiment, the number of intervals G2 of the second middle sipes 55, 57 adjacent in the tire circumferential direction (hereinafter referred to as the intervals G2 of the second middle sipes 55, 57) are preferably larger than the number of intervals G1 of the first middle sipes 51 adjacent in the tire circumferential direction (hereinafter referred to as the intervals G1 of the first middle sipes 51). "Intervals of the sipes adjacent in the tire circumferential direction" refers to intervals of positions where lines extending the sipes along the shapes of the sipes extending on the tread surface intersect the groove wall of the main groove in communication with the sipes (hereinafter the communicating positions), the positions being adjacent in the tire circumferential direction. Two adjacent communicating positions may be located in the same main groove or in different main grooves. Thus, the intervals between second middle sipes having the communicating positions at the same positions in the tire circumferential direction in the region are not included in the "intervals of the sipes adjacent in the tire circumferential direction".

In the present embodiment, the first middle region 71 and the second middle region 75 include the sipes 51, 55, 57, and this reduces groove volume and improves noise performance, compared to a configuration in which the same include lug grooves instead of the sipes 51, 55, 57. On the other hand, the first middle region 71 including the narrow groove 33 compensates for degradation of drainage properties, which is caused by the inclusion of the sipes 51 instead of the lug grooves, and suppresses degradation of wet performance. Additionally, in the second middle region 75, as described above, the number of intervals G2 of the second middle sipes 55, 57 is larger than the number of intervals G1 of the first middle sipes 51, and this reduces the rigidity of the land portion of the second middle region 75 and makes the same easily deformable and more likely to follow road surface. Thus, in the second middle region 75, adhesion friction with road surface is large, and the effect of suppressing degradation of wet performance increases. That is, the present embodiment suppresses degradation of wet performance while improving noise performance, compared to a configuration including lug grooves instead of the sipes 51, 55, 57. In the present embodiment, two middle regions 71, 75 differ in shape and have different functions with respect to wet performance, and this yields the effect of suppressing degradation of wet performance. Thus, the tread pattern of the present embodiment is asymmetric with respect to the tire centerline CL.

Here, in a configuration in which the number of intervals G2 of the second middle sipes 55, 57 is equal to or less than the number of intervals G1 of the first middle sipes 51, the rigidity of the second middle region 75 is too high, the land portion is not easily deformed, and followability to road surface is not excellent. Thus, a force to grip road surface by variation in the force received from road surface is insufficient.

According to an embodiment, the tread pattern preferably does not include lug grooves in the first middle region 71 that communicate with or connect to at least one of the first outer main groove 21 or the first inner main groove 23 and extend in the tire width direction, or lug grooves in the second middle region 75 that communicate with or connect to at least one of the second outer main groove 27 or the second inner main groove 25 and extend in the tire width direction. This reduces groove volume and improves noise performance. According to a further embodiment, the tread pattern preferably does not include lug grooves in the center region 73 that communicate with or connect to at least one of the first inner main groove 23 and the second inner main groove 25 and extend in the tire width direction. Lug groove is a groove having a component extending in the tire width direction and having a groove width of 1.5 mm or more.

According to an embodiment, the second middle sipes preferably include, as in the example illustrated in FIG. 2, the second middle sipes 55 communicating with the second inner main groove 25 and the second middle sipes 57 having communicating positions with the second outer main groove 27 at different positions in the tire circumferential direction from communicating positions between the second middle sipes 55 and the second inner main groove 25. Thus, in a configuration in which the second middle region 75 includes both the sipes communicating with the second inner main groove 25 and the sipes communicating with the second outer main groove 27, the balance of the rigidity of the land portion in the second middle region 75 in the tire width direction improves, and the land portion can easily follow various changes in the force received from road surface.

The percentage of the number of second middle sipes 55 and second middle sipes 57 to the total number of second middle sipes is preferably from 20 to 80%, and is more preferably from 30 to 70%.

In this embodiment, according to a further embodiment, the second middle sipes 57 are disposed one by one between the second middle sipes 55 adjacent in the tire circumferential direction. Accordingly, the balance of the rigidity in the tire width direction of the land portion of the second middle region 75 particularly improves. The percentages described above are preferably 50% each.

In an embodiment in which a length L1 is a length along the tire circumferential direction between two communicating positions at which two second middle sipes 55 adjacent in the tire circumferential direction communicate with the second circumferential main groove 25, the communicating positions of the second middle sipes 57 with the second outer main groove 27, as illustrated in FIG. 2, are preferably within the range of from 50 to 97% of the length L1 from one of the two communicating positions (first side in FIG. 2), and more preferably within the range of from 70 to 95% thereof. This increases an effect of reducing tire noise. Note that "one of the two communicating positions" refers to a communicating position of the second middle sipe 55 with the second inner main groove 25, the second middle sipe 55 including a closed end within a range in the tire circumferential direction between the two communicating positions.

In these embodiments, according to a further embodiment, the direction connecting two ends of the second middle sipe 55 in the extension direction thereof and the direction connecting two ends of the second middle sipe 57 in the extension direction thereof are preferably inclined, as a direction from one end to the other in the tire width direction, toward the same side in the tire circumferential direction with respect to the tire width direction. This can suppress, in the second middle region 75, concentration of locations where the rigidity of the land portion is low. In the example illustrated in FIG. 2, the two directions are inclined to a first side (upper side in FIG. 2) in the tire circumferential direction with respect to the tire width direction. According to a further embodiment, the first middle sipe 51 and the second middle sipes 55, 57 preferably have the relationship, described above, of being inclined to the same side in the tire circumferential direction, and more preferably the first middle sipe 51, the center sipe 53, and the second middle sipes 55, 57 have the relationship, described above, of being inclined to the same side in the tire circumferential direction.

According to an embodiment, the length of the intervals G2 of the second middle sipes 55, 57 is preferably different between the intervals adjacent in the tire circumferential direction. FIG. 2 illustrates a plurality of the intervals G2 having different lengths. This yields the effect of dispersing the frequency of pattern noise, contributing to improving noise performance.

According to an embodiment, the first middle sipes 51 preferably connect to the narrow groove 33. This increases the drainage properties in the first middle region 71.

In this embodiment, according to a further embodiment, as illustrated in FIG. 3, a sipe depth $D51c$ of a narrow groove side connection portion $51c$ of the first middle sipe 51, the narrow groove side connection portion connecting to the narrow groove 33, is smaller than a groove depth $D33$ of the narrow groove 33, and a sipe depth $D51b$ of an intermediate portion $51b$ of the first middle sipe 51, the intermediate portion being located between the first outer main groove 21, which communicate with the first middle sipe 51, and the narrow groove side connection portion $51c$, is greater than the groove depth $D33$ of the narrow groove 33. The narrow groove side connection portion $51c$ having such a raised bottom portion can suppress a decrease in rigidity at the connection position of the first middle sipe 51 to the narrow groove 33. Further, the intermediate portion $51b$ of the first middle sipe 51 is deeper than the narrow groove 33, and this improves the water absorbency of the first middle sipe 51 and contributes to improving wet performance. FIG. 3 is a diagram illustrating a cross-section of a region of a portion, in the tire width direction, of the first middle region 71, which is along the extension direction of the first middle sipe 51. FIG. 3 omits a third chamfered surface, which is described below.

In these two embodiments, according to a further embodiment, a sipe depth $D51a$ of a main groove side communicating portion $51a$, of the first middle sipe 51, the main groove side communicating portion communicating with the first outer main groove 21, is preferably smaller than the groove depth $D33$ of the narrow groove 33. The main groove side communicating portion $51a$ having such a raised bottom portion can suppress a decrease in the rigidity in a communicating position of the first middle sipe 51 with the first outer main groove 21.

The sipe depth $D51c$ of the narrow groove side connection portion $51c$ and the sipe depth $D51a$ of the main groove side communicating portion 51a are preferably from 20 to 50% of the sipe depth D51b of the intermediate portion 51b, and more preferably from 30 to 40% thereof.

A groove depth D21 of the first outer main groove 21, the sipe depth D51b of the intermediate portion 51b, the groove depth D33 of the narrow groove 33, and the sipe depths D51c, D51a of the narrow groove side connection portion 51c and the main groove side communicating portion 51a preferably become smaller in this order. That is, D21>D51b>D33>D51c, D51a is preferable. D51c and D51a may be different from each other, but are preferably equal.

According to an embodiment, the first middle sipe 51 preferably extends in a curved shape so as to bulge roundly to one side in the tire circumferential direction on the tread surface. This suppresses movement, in the first middle region 71, of portions on two sides of the first middle sipe 51 in the tire circumferential direction to be displaced from each other in the tire width direction when a lateral force is applied, and this contributes to improving wet performance. In the example illustrated in FIG. 2, the first middle sipe 51 extends so as to form an arc shape that bulges to a first side in the tire circumferential direction on the tread surface. The radius of curvature of the arc shape of the first middle sipe 51 is preferably from 50 to 150 mm. On the other hand, the second middle sipes 55, 57 and the center sipes 53 preferably extend in a straight line on the tread surface.

In this case, according to another embodiment, the length of the first middle sipe 51 in the extension direction thereof is preferably greater than the Lengths of the second middle sipes 55, 57 in the extension directions thereof. The number of first middle sipes 51 is smaller than the total number of second middle sipes 55, 57, and such an embodiment contributes to improving the balance of the rigidity of the first middle region 71 and the second middle region 75. Also, this facilitates adjustment of the rigidity of the first middle region 71 to a level between the rigidity of the second middle region 75 and that of the center region 73. Note that the length of the first middle sipe 51 in the extension direction thereof is preferably greater than the length of the center sipe 53 in the extension direction thereof (for example, from 115 to 125% of the length of the center sipe 53 in the extension direction thereof).

According to an embodiment, the second middle sipes 55, 57 each extend in a straight line, and the inclination angle, with respect to the tire width direction, of the direction connecting two ends of the extension direction of the second middle sipe 55 and the inclination angle, with respect to the tire width direction, of the direction connecting two ends of the extension direction of the second middle sipe 57 are preferably different between the second middle sipes 55, 57 that are adjacent in the tire circumferential direction.

According to an embodiment, the number of intervals G2 of the second middle sipes 55, 57 is preferably larger than the number of intervals G3 of the center sipes 53 adjacent in the tire circumferential direction (hereinafter referred to as the intervals G3 of the center sipes 53). That is, the number of intervals G3 of the center sipes 53 is preferably smaller than the number of intervals G2 of the second middle sipes 55, 57. The center region 73 has, in the tread portion, the longest ground contact length in the tire circumferential direction, and thus a ground contact area with the road surface is preferably ensured according to the embodiment described above.

In this case, according to a further embodiment, the length of the second middle sipe 55 and the length of the second sipe 57 in the tire width direction are preferably from 20 to 50% of the length of the second middle region 75 in the tire width direction, and more preferably from 30 to 40% of the same, and the length of the center sipe 53 in the tire width direction is from 40 to 70% of the length of the center region 73 in the tire width direction, and more preferably from 50 to 60% of the same. This can suppress an excessive decrease in the rigidity of the second middle region 75 and of the center region 73.

Extension Line

Figure 5:
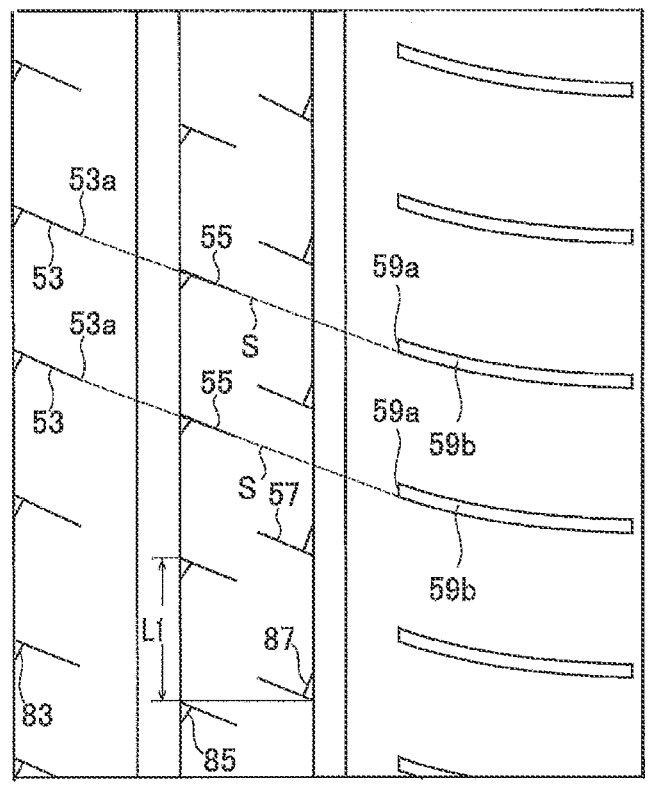
FIG. 5 is a diagram explaining an extension line.

According to an embodiment, as in the example illustrated in FIG. 5, the second middle sipes 55 preferably overlap each of a plurality of extension lines S. The second middle sipe 57 extends between two extension lines S adjacent in the tire circumferential direction, of the plurality of extension lines S, in a direction along the extension lines S. FIG. 5 is a diagram explaining the extension lines S, and illustrates two of the extension lines S in dashed lines.

The extension lines S are imaginary lines extending a plurality of the shoulder lugs 59 from the closed ends 59a of the plurality of the shoulder lug grooves 59 smoothly along an inclination direction of the main groove side portions 59b toward closed ends 53a of a plurality of the center sipes 53. The main groove side portion 59b is a portion of the shoulder lug groove 59 on a main groove 27 side, the portion including the closed end 59a. The extension line S is a straight line. "Extending smoothly" means that, of angles formed at the closed ends 59a, 53a of the shoulder lug groove 59 between an inclination direction of the shoulder lug groove 59 with respect to the tire width direction and an extension direction of the extension line S, a smaller one is 10 degrees or less, and preferably 5 degrees or less. Of angles formed at the closed end 53a of the center sipe 53 between an inclination direction of the center sipe 53 and an inclination direction of the extension line S, a smaller one is preferably 10 degrees or less, and more preferably 5 degrees or less. Still more preferably, the two directions are the same.

That "the second middle sipes 55 overlap the extension lines S" includes not only an embodiment in which the second middle sipes 55 each contact or intersect the extension line S but also an embodiment in which the second middle sipes 55 each contact or intersect a region twice as distant from the extension line S in a direction orthogonal to the extension line S as the groove width of the main groove side portion 59b of the shoulder lug groove 59. Further, that "the second middle sipe 57 extends in a direction along the extension lines S" means that an inclination angle of the extension direction of the second middle sipe 57 with respect to the extension lines S is 10 degrees or less, preferably 5 degrees or less, and more preferably 0 degrees.

Thus, the shoulder lug groove 59, the second middle sipe 55, and the center sipe 53 overlap the extension line S inclined with respect to the tire width direction, and so the shoulder lug groove 59, the second middle chamfered surface 87, and the second middle chamfered surface 85 are easily dispersed in the tire circumferential direction, contributing to improving noise performance.

On the other hand, the second middle chamfered surface 87 is disposed closer to the shoulder lug groove 59 than the second middle chamfered surface 85. Accordingly, the second middle chamfered surface 87 is disposed between two extension lines S adjacent in the tire circumferential direction, extending along the extension lines S, and thus does not overlap the extension lines S. Since the shoulder lug groove 59 has a large groove volume and generates a loud popping sound, the second middle chamfered surface 87 and the shoulder lug groove 59 are preferably separated from each other in the tire circumferential direction.

According to an embodiment, preferably, each of all the shoulder lug grooves 59 and the center sipes 53 forms an end in the extension direction of one of the plurality of extension lines S. and each of all the second middle sipes 55 overlaps one of the extension lines 5, and each of all the second middle sipes 57 extends between one of pairs of the extension lines S adjacent in the tire circumferential direction. Accordingly, an effect of dispersing the second middle chamfered surface 85, the second middle chamfered surface 87, and the shoulder lug groove 59 at mutually different positions in the tire circumferential direction can be obtained across an entire circumference in the tire circumferential direction, and the effect of improving noise performance increases.

Further, according to an embodiment, the range of the second middle chamfered surface 85 along the tire circumferential direction preferably does not overlap the range of the shoulder lug groove 59 along the tire circumferential direction. The second middle chamfered surface 85 and the shoulder lug groove 59 being disposed at mutually different positions in the tire circumferential direction contributes to improving noise performance.

According to an embodiment, ranges in the tire circumferential direction of the extension lines S adjacent in the tire circumferential direction preferably do not overlap each other. An embodiment in which ranges of two extension lines S along the tire circumferential direction overlap each other is less likely to yield the effect of dispersing the second middle chamfered surface 85, the second middle chamfered surface 87, and the shoulder lug groove 59 in the tire circumferential direction. Thus, the magnitude of the inclination angle of the extension line S with respect to the tire width direction is preferably from 10 to 30 degrees.

Further, according to an embodiment, the center sipe 53, the second middle sipe 55, and the second middle sipe 57 preferably have substantially equal inclination angles with respect to the tire width direction. "Substantially equal" refers to a difference in the inclination angle between the lug grooves being up to 10 degrees, and preferably up to 5 degrees.

According to an embodiment, the first middle sipe 51 preferably overlaps an imaginary straight line (second extension line), not illustrated, extending from a connection position of the center sipe 53 to the first inner main groove 23 to the outer side in the tire width direction (vehicle mounting inner side in FIG. 2) along the inclination direction of the center sipe 53 with respect to the tire width direction. "First middle sipe 51 overlapping the second extension line" includes not only an embodiment in which the first middle sipe 51 contacts or intersects the second extension line but also an embodiment in which the first middle sipe 51 contacts or intersects a region twice as distant from the extension line S in a direction orthogonal to the extension line S as the groove width of the main groove side portion 58*b* of the shoulder lug groove 58.

In the tread pattern according to the example illustrated in FIG. 2, no lug grooves and sipes communicating with or connected to the narrow groove 33 or the first inner main groove 23 are provided in the region 71B between the narrow groove 33 and the first inner main groove 23, and a rib extending continuously in the tire circumferential direction is formed therein. Additionally, the region 77B of the shoulder region 77 does not include lug grooves or sipes communicating with or connected to the narrow groove 31 or the main groove 21, and includes a rib extending continuously in the tire circumferential direction. Thus, in a region, disposed on a vehicle inner side, of the tread pattern, two narrow grooves 31, 33 form many edge components extending in the tire circumferential direction, and the rigidity of the two ribs is ensured. This increases steering stability by an inner ring during turning. Preferably, the length (width) of the region 77B in the tire width direction is larger than the width of the region 71B. The narrow groove 31 preferably has a wider groove width than the narrow groove 33.

The tread pattern of the present embodiment is not limited to the tread pattern according to the example illustrated in FIG. 2.

COMPARATIVE EXAMPLES AND EXAMPLES

To examine effects of a tire of the present embodiment, the tread pattern of the tire was varied, and wet performance and noise performance were examined. The prototype tires each had a size of 235/60R18, and except for specifications indicated in Table 1 and below, were based on the tread pattern illustrated in FIG. 2 and the cross-section profile illustrated in FIGS. 1 and 3, and based the chamfered surfaces and wall surfaces on the embodiment illustrated in FIG. 4.

Table 1 indicates an embodiment related to the tread pattern of each of the tires and evaluation results thereof.

Comparative Example and Examples including chamfered surfaces, the chamfered surfaces each have a substantially triangular shape as illustrated in FIG. 4. The wall surface adjacent to the chamfered surface is a surface that extends without being inclined in the tire radial direction and extends along the extension direction of the sipe.

Also, in Comparative Example and Examples including chamfered surfaces, the chamfered surfaces 81, 83, 85, 87 are inclined to the main grooves 21, 23, 25, 27, respectively, and the maximum depths of the chamfered surfaces 81, 83, 85, 87 are 70% of the depths of the main grooves 21, 23, 25, 27, respectively, and are greater than the maximum depths of the sipes 51, 53, 55, 57, respectively, which open to the chamfered surfaces 81, 83, 85, 87, respectively. On the other hand, the maximum depth of the chamfered surface 89 is 50% of the sipe depth of the raised bottom portion (narrow groove connection portion) of the first middle sipe.

In Table 1. "longitudinal/lateral length ratio of chamfered surface" refers to the ratio of the tire circumferential direction length of the chamfered surface to the tire width direction length thereof. In Comparative Example 3 and Examples, the chamfered surfaces 81, 83, 85, 87 have the same tire width direction length. Further, in Comparative Example 3, the ratio of each of the chamfered surfaces 81, 83, 85, 87 was set to 1:3.

"Longitudinal length percentage of chamfered surface" refers to the percentage of the tire circumferential direction length of each of the chamfered surfaces 81, 83, 85, 87 to the interval of the sipes that open to the chamfered surface, the sipes being adjacent in the tire circumferential direction.

"Longitudinal length difference between chamfered surfaces" refers to whether there is a difference in the tire circumferential direction length between the chamfered surfaces 81, 83, 85, 87. In the "Yes" example, the tire circumferential direction length of the chamfered surfaces 83, 85 was ⅔ times the tire circumferential direction length of the chamfered surfaces 81, 87. Note that for the "Yes" example, the "longitudinal/lateral length percentage of chamfered surface" and "longitudinal length percentage of chamfered surface" in the table are represented by values of the chamfered surfaces 81, 87.

"Circumferential direction overlap of chamfered surfaces" refers to the overlap in the tire circumferential direction of ranges of positions of the chamfered surfaces 81, 83, 85, 87. The "Yes" examples and comparative example have the same configuration as Example 4 except that the center region 73 was shifted in the tire circumferential direction with respect to the first middle region 71, so that the range, in the tire circumferential direction, of the location of the chamfered surface 83 overlaps with the ranges, in the tire circumferential direction, of positions of the chamfered surfaces 81, 85.

"Number of sipe intervals of regions 71, 75" refers to the magnitude relationship between the number of intervals G1 of the first middle sipes 51 in the first middle region 71 and the number of intervals G2 of the second middle sipes 55, 57 in the second middle region 75. "71=75" means that the number of intervals G1 and the number of intervals G2 are the same, whereas "71<75" means that the number of intervals G2 is larger than the number of intervals G1. The "71=75" examples and comparative examples have the same configuration as the "71<75" examples except that the length of the interval of the second middle sipes 55, 57 was set to twice the length of the interval thereof in the "71<75" examples, and that the number of second middle sipes and that of the first middle sipes Si were the same.

Comparative Example 1 has the same configuration as Comparative Example 2 except that the sipes 51, 53, 55, 57 were replaced with lug grooves. These test tires were evaluated for noise performance and wet performance as described below. The results of the evaluation were indicated in Tables 1 and 2. In the evaluation, each of the test tires was mounted on a wheel having a rim size of 18×7.5.J, mounted on a front wheel drive vehicle of engine displacement of 2400 cc, and inflated to an air pressure of 230 kPa.

Noise Performance

Each test tire was measured for pass-by noise outside of a vehicle in accordance with the European noise regulation conditions (ECER117). The evaluation results were expressed as index values by using reciprocals of measurement values, with Comparative Example 1 being assigned as the reference 100. Larger index values mean excellent noise performance.

Wet Performance

Running at a speed of from 40 to 100 km/hr was performed on a test course of an asphalt road surface sprayed with water having a depth of less than 1 mm, and a test driver performed sensory evaluation on steering characteristics when changing lanes and when cornering, and on stability when traveling straight. Wet performance is expressed as index values with Comparative Example 1 used as a tire according to the related art and assigned as the reference 100. Larger index values indicate excellent wet performance.

The allowable range of the index value of noise performance for each of the tires having the size of 235/60R18 was evaluated to be 103 or more, and that of the index value of wet performance for the same was evaluated to be 98 and more, and a case meeting these conditions was evaluated to have succeeded in suppressing a decrease in wet performance while improving noise performance.

TABLE 1-1

|  | Comparative Example 1 | Comparative Example 2 | Comparative Example 3 | Example 1 |
|---|---|---|---|---|
| Lug groove or sipe | Lug groove | Sipe | Sipe | Sipe |
| Presence of chamfered surface | No | No | Yes | Yes |
| Longitudinal/lateral length ratio of chamfered surface | — | — | 1:3 | 12:1 |
| Longitudinal length percentage of chamfered surface (%) | — | — | 1.7 | 20 |
| Difference in longitudinal length between chamfered surfaces | — | — | No | No |
| Circumferential direction overlap of chamfered surfaces | — | — | Yes | Yes |
| Number of sipe intervals of regions 71, 75 | — | 71 = 75 | 71 = 75 | 71 = 75 |
| Side including second half-tread region | In | In | In | In |
| Noise performance | 100 | 110 | 109 | 106 |
| Wet performance | 100 | 95 | 97 | 99 |

TABLE 1-2

|  | Example 2 | Example 3 | Example 4 | Example 5 | Example 6 |
|---|---|---|---|---|---|
| Lug groove or sipe | Sipe | Sipe | Sipe | Sipe | Sipe |
| Presence of chamfered surface | Yes | Yes | Yes | Yes | Yes |
| Longitudinal/lateral length ratio of chamfered surface | 3:1 | 3:1 | 3:1 | 3:1 | 3:1 |
| Longitudinal length percentage of chamfered surface (%) | 5 | 5 | 5 | 5 | 5 |
| Difference in longitudinal length between chamfered surfaces | No | Yes | Yes | Yes | Yes |
| Circumferential direction overlap of chamfered surfaces | Yes | Yes | No | No | No |

TABLE 1-2-continued

|  | Example 2 | Example 3 | Example 4 | Example 5 | Example 6 |
|---|---|---|---|---|---|
| Number of sipe intervals of regions 71, 75 | 71 = 75 | 71 = 75 | 71 = 75 | 71 < 75 | 71 < 75 |
| Side including second half-tread region | In | In | In | In | Out |
| Noise performance | 108 | 109 | 111 | 110 | 112 |
| Wet performance | 98 | 98 | 98 | 101 | 102 |

A comparison between Comparative Example 1 and Example 1 reveals that a decrease in wet performance can be suppressed while noise performance can be improved in a configuration in which the first sipes and the second sipes are provided and the chamfered surfaces opening to the sipes are longer in the tire circumferential direction than in the tire width direction.

A comparison between Comparative Example 3 and Example 1 reveals that the chamfered surfaces that are longer in the tire circumferential direction than in the tire width direction can improve wet performance.

A comparison between Example 1 and Example 2 reveals that noise performance improves in a configuration in which the ratios of the tire width direction lengths of the chamfered surfaces to the tire circumferential direction lengths thereof are greater than 1, and 10 or less.

A comparison between Example 2 and Example 3 reveals that wet performance improves in a configuration in which the chamfered surfaces 81, 83, 85, 87 differ in tire circumferential direction length.

A comparison between Example 3 and Example 4 reveals that wet performance improves in a configuration in which the ranges in the tire circumferential direction of the positions of the chamfered surfaces 81, 83, 85, 87 do not overlap each other.

A comparison between Example 4 and Example 5 reveals that a configuration including more intervals of the second middle sipes than those of the first middle sipes improves wet performance.

A comparison between Example 5 and Example 6 reveals that noise performance and wet performance improve by mounting a tire on a vehicle such that the second half-tread region is disposed on the vehicle outer side of the first half-tread region.

Although the tire according to an embodiment of the present technology has been described above in detail, the tire according to an embodiment of the present technology is not limited to the embodiments or examples that have been described above, and may of course be enhanced or modified in various ways without departing from the scope of the present technology.

The invention claimed is:

1. A tire comprising a tread pattern in a tread portion, the tread pattern comprising:
    a first circumferential main groove and a second circumferential main groove extending in a tire circumferential direction and disposed at an interval in a tire width direction;
    a plurality of first sipes extending in the tire width direction within a region of a first land portion between the first circumferential main groove and the second circumferential main groove and disposed at intervals in the tire circumferential direction;
    a first chamfered surface having a tread surface of the first land portion inclined toward the first circumferential main groove in an end portion in the tire width direction on a first circumferential main groove side of the first land portion, the first chamfered surface being provided in plurality in the tire circumferential direction, and the first sipes opening to the plurality of the first chamfered surfaces without reaching a groove wall of the first circumferential main groove;
    a plurality of second sipes extending in the tire width direction within a region of a second land portion located on an opposite side of the region of the first land portion with respect to the second circumferential main groove and disposed at intervals in the tire circumferential direction; and
    a second chamfered surface having a tread surface of the second land portion inclined toward the second circumferential main groove in an end portion in the tire width direction on a second circumferential main groove side of the second land portion, the second chamfered surface being provided in plurality in the tire circumferential direction, and the second sipes opening to the plurality of the second chamfered surfaces without reaching a groove wall of the second circumferential main groove;
    a length in the tire circumferential direction of the first chamfered surface and a length in the tire circumferential direction of the second chamfered surface being greater than a length in the tire width direction of the first chamfered surface and a length in the tire width direction of the second chamfered surface; wherein
    each of the first chamfered surface and the second chamfered surface has a substantially triangular shape that decreases in length in the tire width direction from one side in the tire circumferential direction to an other side in the tire circumferential direction.

2. The tire according to claim 1, wherein the length of each of the first chamfered surface and the second chamfered surface in the tire circumferential direction is from 5 to 50% of a length of an interval of the first sipes or the second sipes adjacent in the tire circumferential direction, the first sipes or the second sipes opening to the chamfered surface.

3. The tire according to claim 1, wherein a ratio of the length of each of the first chamfered surface and the second chamfered surface in the tire circumferential direction to the length of each of the first chamfered surface and the second chamfered surface in the tire width direction is greater than 1, and 10 or less.

4. The tire according to claim 1, wherein the lengths in the tire circumferential direction of the first chamfered surface and the second chamfered surface are different from each other.

5. The tire according to claim 4, wherein
    the first chamfered surface and the second chamfered surface are disposed on one side of a tire centerline in the tire width direction, and of the first chamfered surface and the second chamfered surface, the length in the tire circumferential direction of the one chamfered surface that is farther from the tire centerline is greater than the length in the tire circumferential direction of the one chamfered surface that is closer to the tire centerline.

6. The tire according to claim 4, wherein ranges of positions of the first chamfered surface and the second chamfered surface in the tire circumferential direction do not overlap each other.

7. The tire according to claim 1, wherein a maximum depth of each of the first chamfered surface and the second chamfered surface is greater than a depth of each of the first sipes and the second sipes opening to the chamfered surface.

8. The tire according to claim 1, wherein each of the first sipes and the second sipes comprises a raised bottom portion at an opening end portion of the sipe opening to the first chamfered surface or the second chamfered surface, the raised bottom portion having a depth greater than a maximum depth of the first sipes and the second sipes.

9. The tire according to claim 1, wherein
the tread pattern further comprises, in the region of each of the first land portion and the second land portion, a wall surface of the first land portion or the second land portion adjacent to the first chamfered surface or the second chamfered surface, the wall surface of the first land portion or the second land portion extending continuously from a wall surface of the first sipes or the second sipes, from an opening end portion of the first sipes or the second sipes opening to the first chamfered surface or the second chamfered surface to a wall surface of the circumferential main groove to which the first chamfered surface or the second chamfered surface is inclined, and
the wall surface extends without being inclined with respect to a tire radial direction.

10. The tire according to claim 1, wherein
the tread pattern further comprises, in the region of each of the first land portion and the second land portion, a wall surface of the first land portion or the second land portion adjacent to the first chamfered surface or the second chamfered surface, the wall surface of the first land portion or the second land portion extending continuously from a wall surface of the first sipes or the second sipes, from an opening end portion of the first sipes or the second sipes opening to the first chamfered surface or the second chamfered surface to a wall surface of the circumferential main groove to which the first chamfered surface or the second chamfered surface is inclined, and
the wall surface extends along an extension direction of the first sipes or the second sipes opening to the first chamfered surface or the second chamfered surface.

11. The tire according to claim 1, wherein the first sipes and the second sipes are inclined to a same side in the tire circumferential direction with respect to the tire width direction.

12. The tire according to claim 1, wherein
the tread pattern comprises a circumferential narrow groove extending in the tire circumferential direction in the region of the first land portion and having a groove width smaller than a groove width of the first circumferential main groove and the second circumferential main groove, and
the first sipes are disposed in a region between the first circumferential main groove and the circumferential narrow groove and are is connected to the circumferential narrow groove.

13. The tire according to claim 12, wherein
the tread pattern comprises a third chamfered surface having a tread surface inclined toward the circumferential narrow groove in an end portion in the tire width direction on a circumferential narrow groove side of a region comprising the first sipes, the region being one of two regions of the first land portion that are divided in the tire width direction by the circumferential narrow groove, and
the third chamfered surface is provided in plurality adjacent in the tire circumferential direction to connection end portions of the first sipes with the circumferential narrow groove.

14. The tire according to claim 13, wherein a length of the third chamfered surface in the tire circumferential direction is smaller than the lengths of the first chamfered surface and the second chamfered surface in the tire circumferential direction.

15. The tire according to claim 13, wherein a maximum depth of the third chamfered surface is smaller than a depth of the first sipes.

16. The tire according to claim 1, wherein the tread pattern does not comprise lug grooves extending in the tire width direction within the region of the first land portion and the second land portion.

* * * * *